(12) United States Patent
Funakoshi et al.

(10) Patent No.: US 10,371,270 B2
(45) Date of Patent: Aug. 6, 2019

(54) DIAPHRAGM VALVE

(71) Applicant: FUJIKIN INCORPORATED, Osaka-shi (JP)

(72) Inventors: Takashi Funakoshi, Osaka (JP); Tadayuki Yakushijin, Osaka (JP); Tomohiro Nakata, Osaka (JP)

(73) Assignee: FUJIKIN INCORPORATED, Osaka-shi (JP)

( * ) Notice: Subject to any disclaimer, the term of this patent is extended or adjusted under 35 U.S.C. 154(b) by 0 days.

(21) Appl. No.: 15/559,980

(22) PCT Filed: Mar. 4, 2016

(86) PCT No.: PCT/JP2016/056752
§ 371 (c)(1),
(2) Date: Sep. 20, 2017

(87) PCT Pub. No.: WO2016/152457
PCT Pub. Date: Sep. 29, 2016

(65) Prior Publication Data
US 2018/0106385 A1   Apr. 19, 2018

(30) Foreign Application Priority Data
Mar. 25, 2015   (JP) ................... 2015-062343

(51) Int. Cl.
*F16K 1/14*   (2006.01)
*F16K 7/16*   (2006.01)
(Continued)

(52) U.S. Cl.
CPC ............ *F16K 7/16* (2013.01); *F16K 1/14* (2013.01); *F16K 31/1221* (2013.01);
(Continued)

(58) Field of Classification Search
CPC ..... F16K 7/16; F16K 7/14; F16K 7/12; F16K 31/12; F16K 31/44; F16K 31/0675; F16K 31/1221; F16K 31/1226; Y10T 137/87716
(Continued)

(56) References Cited

U.S. PATENT DOCUMENTS 4,977,929 A * 12/1990 Chinnock et al. ........ F16K 7/16
137/863
5,730,423 A *  3/1998 Wu et al. .................. F16K 7/14
251/331

(Continued)

FOREIGN PATENT DOCUMENTS

JP   55-097568 A   7/1980
JP   02-029361 U   2/1990
(Continued)

OTHER PUBLICATIONS

International Search Report dated May 24, 2016, issued for PCT/JP2016/056752.
(Continued)

*Primary Examiner* — Craig J Price
*Assistant Examiner* — Andrew J Rost
(74) *Attorney, Agent, or Firm* — Locke Lord LLP

(57) ABSTRACT

Provided is a diaphragm valve that improves the durability of a diaphragm by focusing on the ratio of the radius of curvature of a pressing surface of a diaphragm presser to the radius of curvature of the diaphragm. SRb/SRa=0.4 to 0.6 is satisfied, wherein SRa represents the radius of curvature of a diaphragm 5 and SRb represents the radius of curvature of a pressing surface of a diaphragm presser 6.

5 Claims, 6 Drawing Sheets

(51) Int. Cl.
F16K 31/06 (2006.01)
F16K 31/12 (2006.01)
F16K 31/44 (2006.01)
F16K 31/122 (2006.01)

(52) U.S. Cl.
CPC ...... *F16K 31/1226* (2013.01); *F16K 31/0675* (2013.01); *F16K 31/12* (2013.01); *F16K 31/44* (2013.01)

(58) Field of Classification Search
USPC .......................................................... 251/331
See application file for complete search history.

(56) References Cited

U.S. PATENT DOCUMENTS

| | | | |
|---|---|---|---|
| 6,092,550 A * | 7/2000 | Gotch et al. | F16K 7/16 137/365 |
| 6,854,713 B2 * | 2/2005 | Lin et al. | F16K 7/16 251/331 |
| 9,175,779 B2 * | 11/2015 | Watanabe | F16K 7/12 |
| 2005/0109973 A1 * | 5/2005 | Glime et al. | F16K 1/00 251/331 |
| 2014/0001391 A1 | 1/2014 | Watanabe et al. | |
| 2017/0130848 A1 * | 5/2017 | Watanabe | F16K 7/14 |

FOREIGN PATENT DOCUMENTS

| | | |
|---|---|---|
| JP | H06-294471 A | 10/1994 |
| JP | 2014-9765 A | 1/2014 |

OTHER PUBLICATIONS

Office Action dated Aug. 26, 2018 issued for corresponding Korean Patent Application No. 10-2017-7024845.

* cited by examiner

DIAPHRAGM VALVE

TECHNICAL FIELD

The present invention relates to a diaphragm valve, and more particularly, to a diaphragm valve of a type that is referred to as a "direct touch" type.

BACKGROUND ART

A diaphragm valve disclosed in Patent Literature 1 includes a valve body provided with a fluid channel, an annular valve seat provided on the peripheral edge of the fluid channel, a metal diaphragm that has a spherical surface and that is pressed against or separated from the valve seat to close or open the fluid channel, a diaphragm presser that has a lower end having a spherical surface and serving as a pressing surface and that presses the diaphragm, and an actuator that moves the diaphragm vertically.

CITATION LIST

Patent Literature

Patent Literature 1: Japanese Unexamined Utility Model Application Publication No. 2-29361

SUMMARY OF INVENTION

Technical Problem

In the direct touch type diaphragm valve that repeats opening and closing operations, improvement of the durability of the diaphragm is an important issue to address. Patent Literature 1 aims to improve the durability of the diaphragm by optimizing the shape of the diaphragm and the shape of a portion that supports an outer peripheral edge portion of the diaphragm.

However, the relationship between a radius of curvature of the pressing surface of the diaphragm presser and a radius of curvature of the diaphragm has not conventionally been considered.

It is an object of the present invention to provide a diaphragm valve that improves the durability of the diaphragm by focusing on the ratio of the radius of curvature of the pressing surface of the diaphragm presser to the radius of curvature of the diaphragm.

Solution to Problem

The diaphragm valve according to the present invention includes a valve body provided with a fluid channel, a valve seat provided on a peripheral edge of the fluid channel, a diaphragm that has a spherical surface and that is pressed against or separated from the valve seat to close or open the fluid channel, a diaphragm presser that has a lower end having a spherical surface and serving as a pressing surface and that presses the diaphragm, and an actuator that moves the diaphragm vertically. In this diaphragm valve, $SRb/SRa = 0.4$ to $0.6$ is satisfied, wherein $SRa$ represents a radius of curvature of the diaphragm and $SRb$ represents a radius of curvature of the pressing surface of the diaphragm presser.

Conventionally, the radius of curvature of the diaphragm and the radius of curvature of the pressing surface of the diaphragm presser have been determined in the order such that, first, the radius of curvature of the diaphragm is optimized, and then, the radius of curvature of the pressing surface of the diaphragm presser is set to be equal to or slightly less than the radius of curvature of the diaphragm.

In the present invention, it is revealed that, depending on $SRb/SRa$ (the ratio of the radius of curvature of the pressing surface of the diaphragm presser to the radius of curvature of the diaphragm), which has not conventionally been considered, stress applied onto the diaphragm varies. Additionally, in the present invention, the optimal value of $SRb/SRa$, which is in the range of $0.4$ to $0.6$, is obtained.

This diaphragm valve is suitably used as a direct touch type metal diaphragm valve, which is mainly used in a gas supply system of semiconductor manufacturing equipment, and the like.

The diaphragm is made of metal and has the shape of a spherical shell in a natural state, which has a circular arc shape bulging upward. The diaphragm may be of a laminated type, consisting of a plurality of layers. The radius of curvature of an inner surface (the inner surface of the lowermost layer (fluid-contacting side) in the case where the plurality of the layers are provided) of the diaphragm should be referred to as a radius of curvature of the diaphragm.

The valve seat may be integrally formed with the valve body, or may be separately formed from the valve body.

The diaphragm valve may be a manually operated valve in which vertical movement means is an open/close handle and the like, or may be an automatically operated valve in which the vertical movement means is an appropriate actuator. In the case of the automatically operated valve, the actuator may be operated by means of fluid pressure (air pressure), or may be operated by means of an electromagnetic force.

In the present description, the movement direction of a stem of the diaphragm valve is referred to as a vertical direction. This direction is however used for convenience, and in the actual attachment, not only the vertical direction is made the up-down direction, but also the vertical direction is made the horizontal direction, in some cases.

Advantageous Effects of Invention

In the diaphragm valve according to the present invention, $SRb/SRa = 0.4$ to $0.6$ is satisfied wherein $SRa$ represents a radius of curvature of the diaphragm and $SRb$ represents a radius of curvature of the pressing surface of the diaphragm presser. This ensures a uniform stress, which prevents excessive stress from being applied locally onto the diaphragm. This results in extensive improvement of the durability of the diaphragm.

Figure 1:
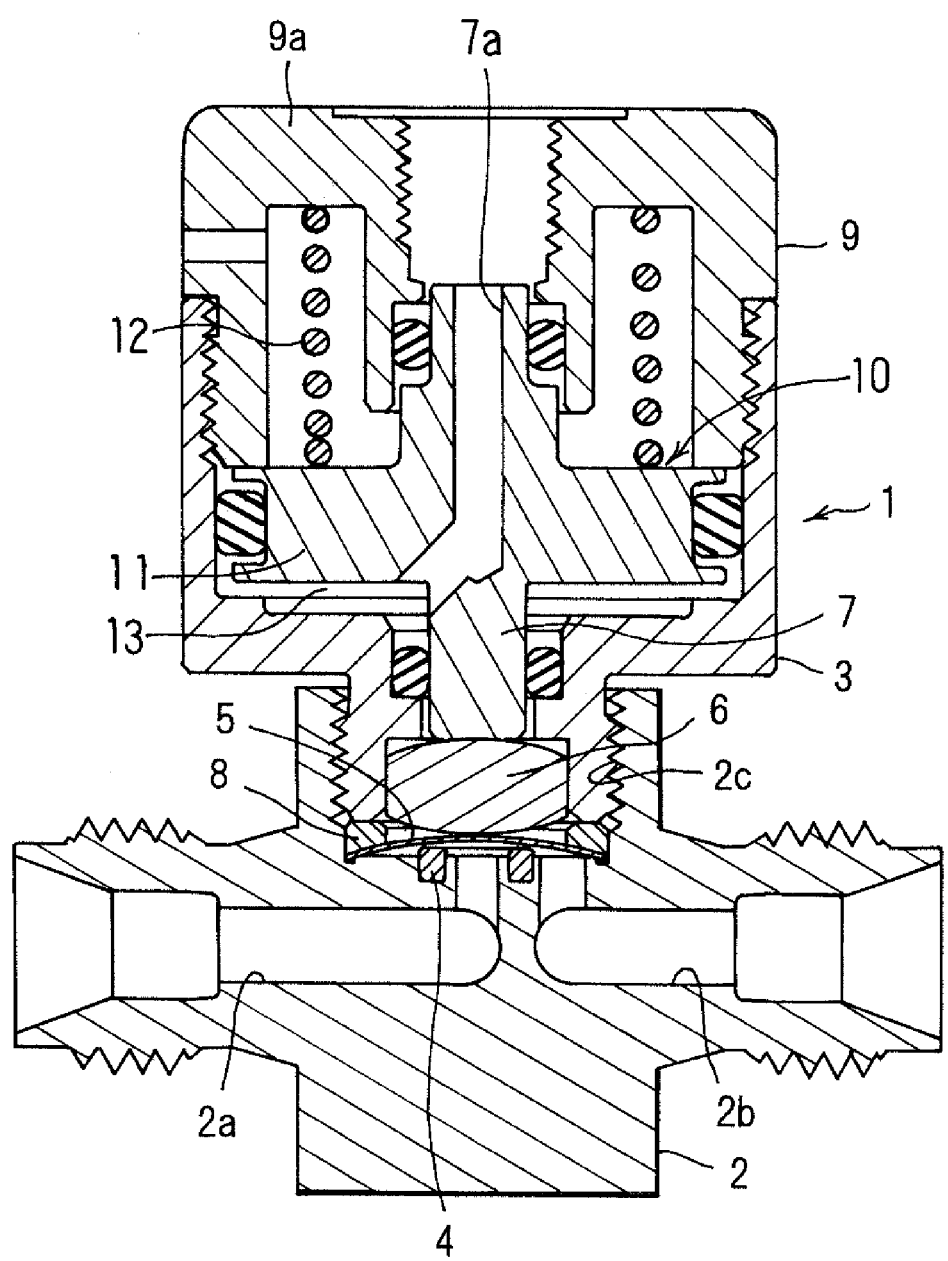
FIG. 1 is a vertical cross-sectional view showing the entire structure of a diaphragm valve according to the present invention.
Figure 2:
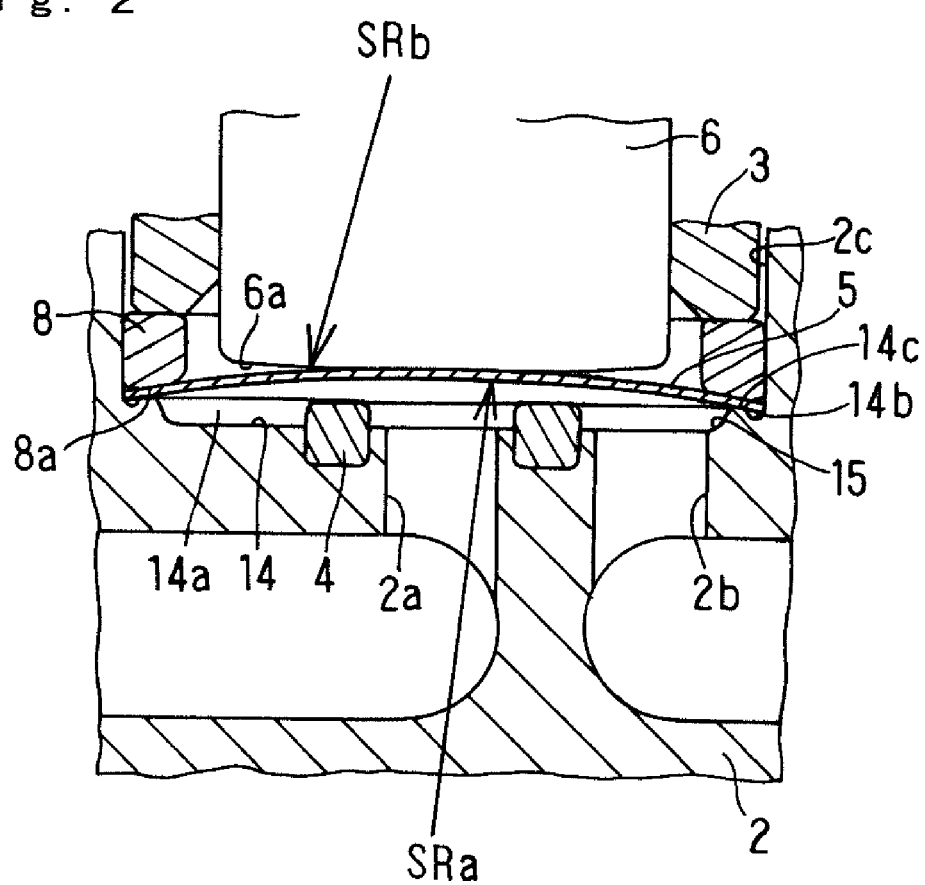
FIG. 2 is an enlarged vertical cross-sectional view showing a characteristic part of the diaphragm valve according to the present invention.

REFERENCE SIGNS LIST (1): diaphragm valve
(2): valve body
(2a): fluid inflow channel
(2b): fluid outflow channel
(4): valve seat
(5): diaphragm
(6): diaphragm presser

DESCRIPTION OF EMBODIMENTS

Embodiments of the present invention will now be described with reference to the drawings. In the following description, the "upper" and "lower" sides in FIG. 1 will be referred to as "upper" and "lower", respectively. The "right" and "left" sides in FIG. 1 will be referred to as "right" and "left", respectively.

FIG. 1 shows a basic configuration of a diaphragm valve (1) according to the present invention. The diaphragm valve (1) includes: a block-like valve body (2) having a fluid inflow channel (2a), a fluid outflow channel (2b), and a depression (2c) opening upward; a cylindrical bonnet (3) extending upward and having a lower end portion that is screwed into an upper portion of the depression (2c) of the body (2); an annular valve seat (4) provided on a peripheral edge of the fluid inflow channel (2a); a diaphragm (5) that is pressed against or separated from the valve seat (4) to close or open the fluid inflow channel (2a); a diaphragm presser (6) that presses a center portion of the diaphragm (5); a stem (7) that is inserted within the bonnet (3) so as to be movable vertically and that causes the diaphragm (5) to be pressed against or separated from the valve seat (4) via the diaphragm presser (6); a press adapter (8) that is placed between a lower end surface of the bonnet (3) and a bottom surface of the depression (2c) of the valve body (2) and that holds the outer peripheral edge portion of the diaphragm (5) between the press adapter (8) and the bottom surface of the depression (2c) of the valve body (2); a casing (9) having a top wall (9a) and being screwed into the bonnet (3); and an actuator (10) that moves the stem (7) vertically.

The actuator (10) includes: a piston (11) integrally formed with the stem (7); a compression coil spring (biasing member) (12) that biases the piston (11) downward; an operational air introduction chamber (13) provided on a lower surface of the piston (11); and an operational air introduction channel (7a) that is provided so as to penetrate the stem (7) and that introduces operational air into the operational air introduction chamber (13).

In a channel open state shown in FIG. 1, a fluid that has flowed in from the fluid inflow channel (2a) flows into a space surrounded by the bottom surface of the depression (2c) of the valve body (2) and the diaphragm (5), and flows out through the fluid outflow channel (2b) to the outside.

The diaphragm (5) has the shape of a spherical shell having a circular arc shape bulging upward in a natural state. The diaphragm (5), for example, is made of a nickel alloy thin sheet, which is cut out into the shape of a circle, and is formed into a spherical shell having the center portion bulging upward.

In some cases, the diaphragm (5) is made of a stainless steel thin sheet, and is made of a layered product formed of a stainless steel thin sheet and a nickel-cobalt alloy thin sheet.

The press adapter (8) has a lower surface (8a). The entire lower surface (8) is tapered or circular arc shaped, with a predetermined angle of inclination. The bottom surface (14) of the depression (2c) of the body (2) has a circular flat portion (14a) and an annular depressed portion (14b) which is contiguous to an outer periphery of the flat portion (14a) and which is depressed relative to the flat portion (14a).

The press adapter (8) is fixed in a state of coming into contact with an upper surface of the outer peripheral edge portion of the diaphragm (5), by the bonnet (3) being screwed into the valve body (2). At this time, the diaphragm (5) is held between the press adapter (8) and the bottom surface (14) of the depression (2c) of the body (2), in a state where the upper surface of the outer peripheral edge portion of the diaphragm (5) is in surface contact (contact over a wide range) with the tapered lower surface (8a) of the press adapter (8) in which the diaphragm (5) hardly deforms from its spherical shell shape (circular arc shape bulging upward), since the entire lower surface (8a) of the press adapter (8) is tapered. In addition, since the outer peripheral edge portion of the bottom surface (14) of the depression (2c) of the valve body (2) is provided with a depressed portion (14b), the outer peripheral edge portion of the diaphragm (5) is accommodated in the depressed portion (14b). Consequently, the outer peripheral edge portion of the diaphragm (5) is not subject to a deformation along the bottom surface (14) of the depression (2c) of the body (2), and the lower surface of the outer peripheral edge portion of the diaphragm (5) comes in line contact with the outer periphery (diaphragm support portion) (14c) of the flat portion (14a) of the bottom surface (14) of the depression (2c).

Conventionally, the radius of curvature of the diaphragm (5) and the radius of curvature of the pressing surface of the diaphragm presser (6) have been determined in the order such that, first, the radius of curvature of the diaphragm (5) is optimized, and then, the radius of curvature of the pressing surface of the diaphragm presser (6) is set to be equal to or slightly less than the radius of curvature of the diaphragm (5).

In the present invention, the relationship between SRb/SRa, where SRa represents the radius of curvature of the diaphragm (5) and SRb represents the radius of curvature of the pressing surface of the diaphragm presser (6), and stress applied onto the diaphragm (5) is analyzed using a finite element method, whereby the radius of curvature of the diaphragm (5) and the radius of curvature of the pressing surface of the diaphragm presser (6) are determined.

Figure 3:
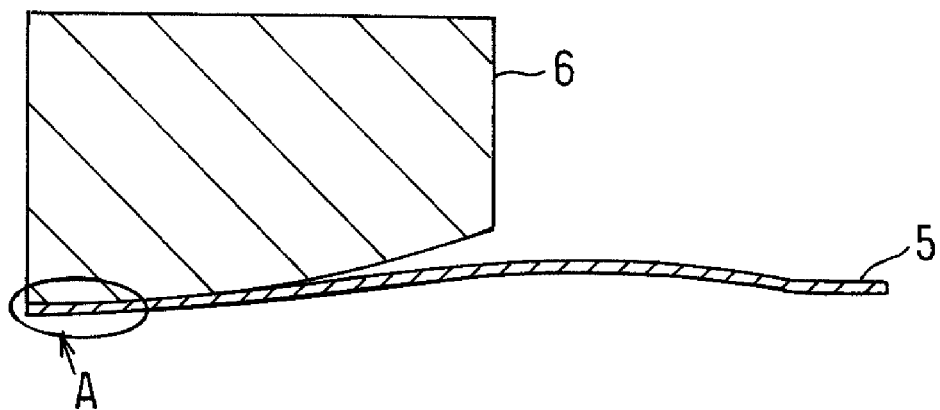
FIG. 3 is a diagram showing an analytical result when $SRb/SRa$ is less than $0.4$.
Figure 4:
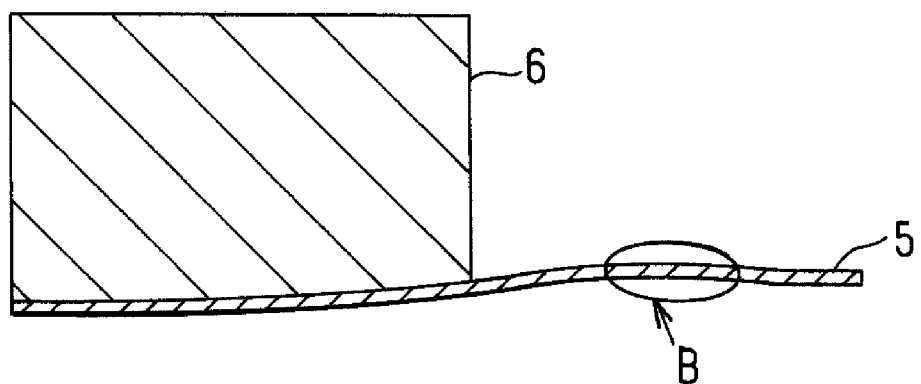
FIG. 4 is a diagram showing an analytical result when $SRb/SRa$ is greater than $0.6$.
Figure 5:
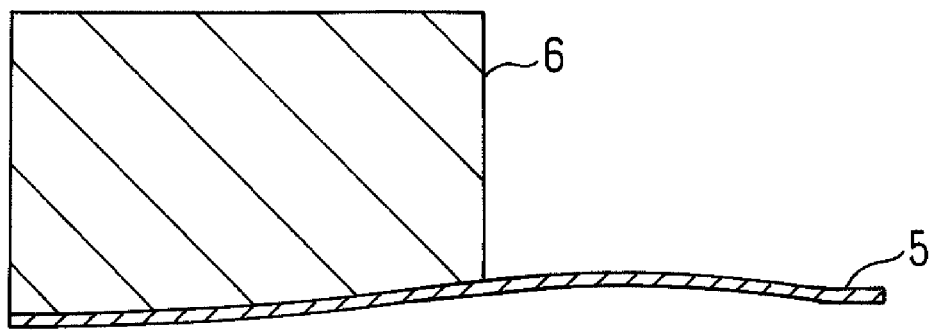
FIG. 5 is a diagram showing an analytical result when $SRb/SRa$ is $0.5$.

FIG. 3 to FIG. 5 show how the diaphragm (5) deforms when the diaphragm (5) is pressed by the diaphragm presser (6) in a closed state of the diaphragm valve (1). FIG. 3 shows the deformation of the diaphragm (5) when SRb/SRa is less than 0.4. FIG. 4 shows the deformation of the diaphragm (5) when SRb/SRa is greater than 0.6. FIG. 5 shows the deformation of the diaphragm (5) when SRb/SRa is 0.5. Stress distribution in each drawing is simply shown by marking a portion where the stress value is great with a circle.

According to the analytical result shown in FIG. 3, stress is maximum at the center portion of the diaphragm (5), which is indicated by portion A shown in FIG. 3, and the value is of the order of 1400 MPa.

According to the analytical result shown in FIG. 4, stress is maximum at the edge portion of the diaphragm (5), which is indicated by portion B in FIG. 4, and the value is of the order of 1100 MPa.

According to the analytical result shown in FIG. 5, the stress at the center portion and the edge portion of the diaphragm (5) is uniform, and the maximum stress value is of the order of 1000 MPa.

Figure 6:
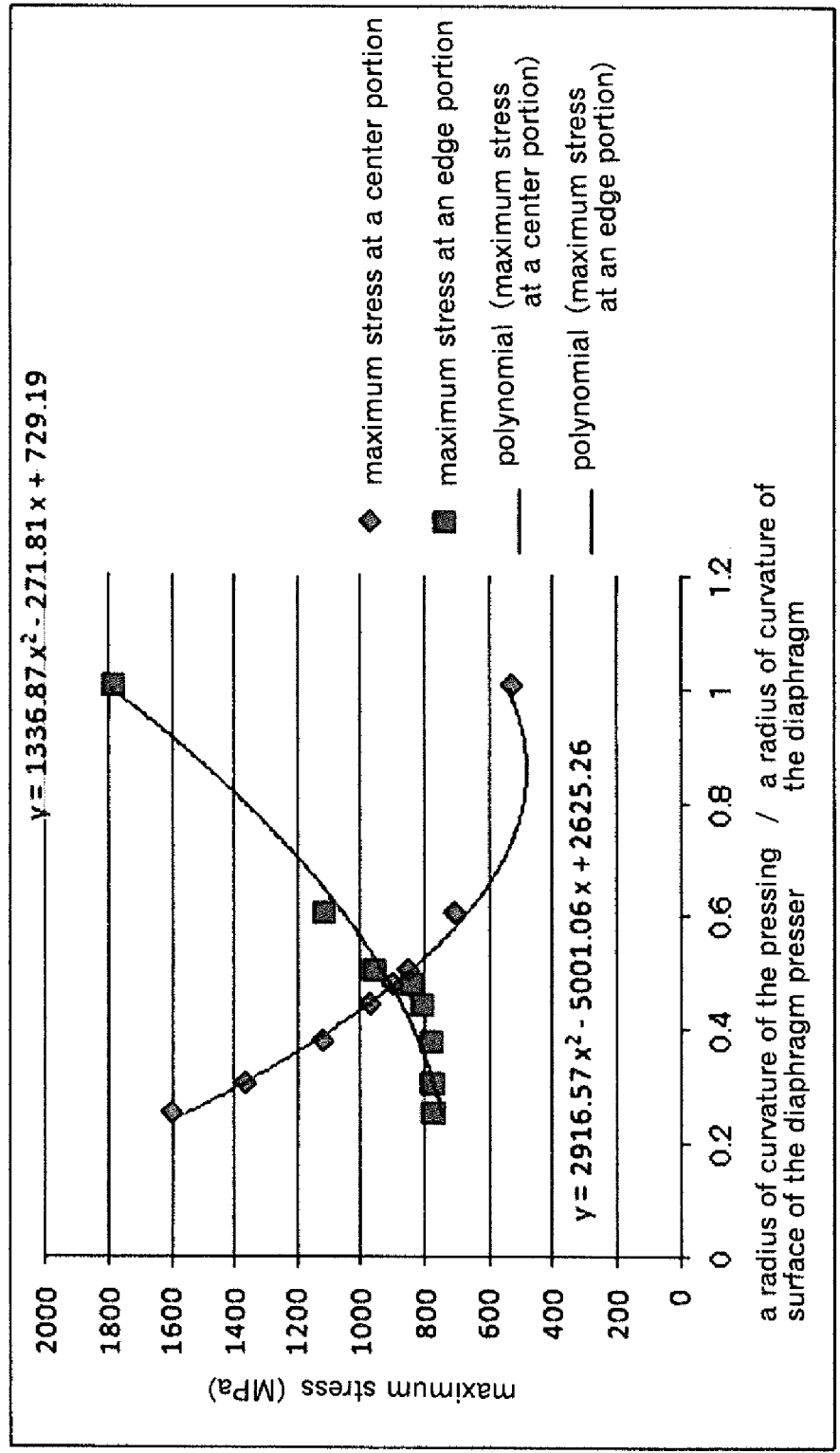
FIG. 6 is a graph showing how the maximum stress at a center portion and the maximum stress at an edge portion vary when $SRb/SRa$ varies in the case where the diameter of the diaphragm is 15 mm.
Figure 7:
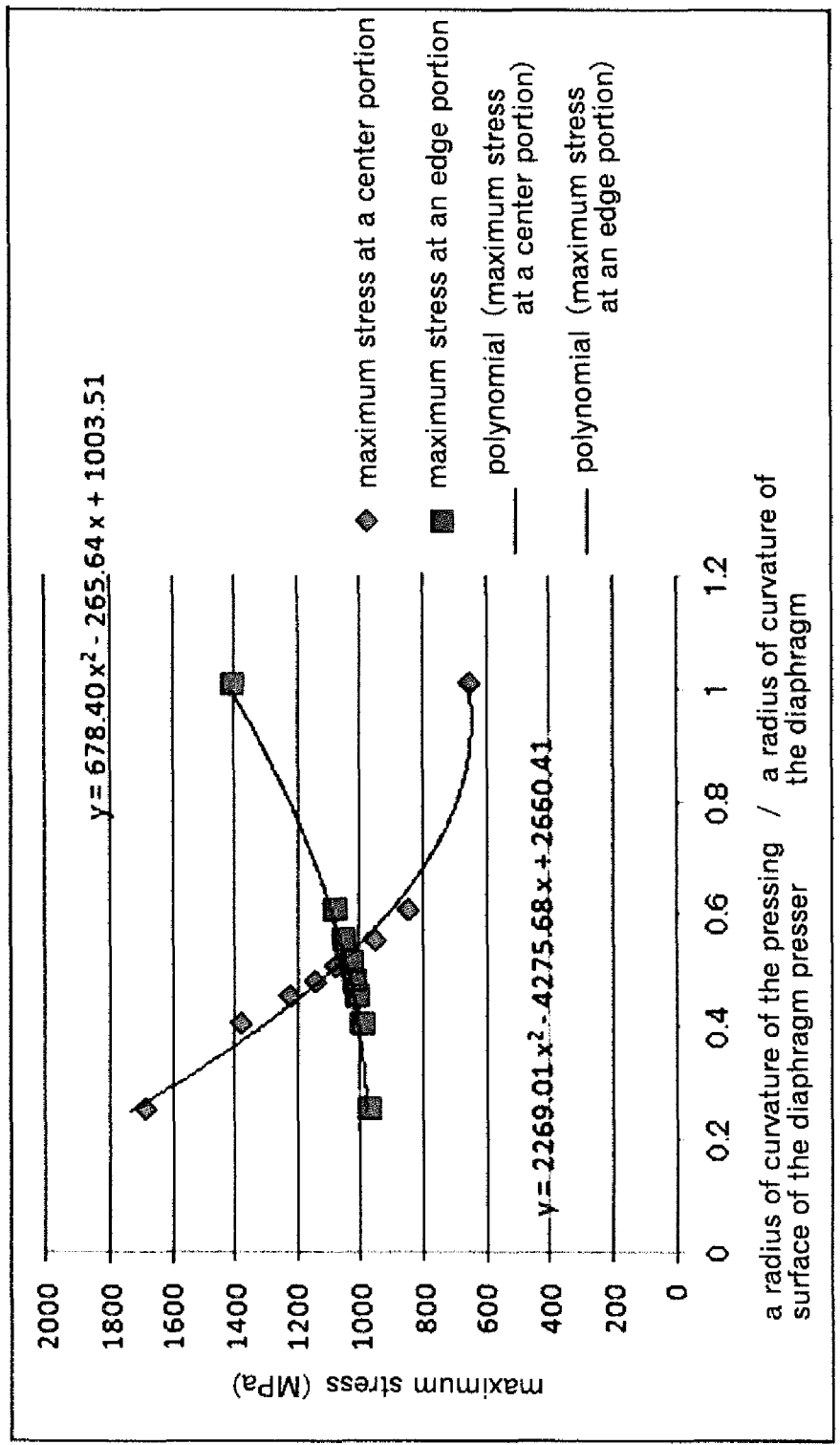
FIG. 7 is a graph showing how the maximum stress at the center portion and the maximum stress at the edge portion vary when SRb/SRa varies in the case where the diameter of the diaphragm is 20 mm.
Figure 8:
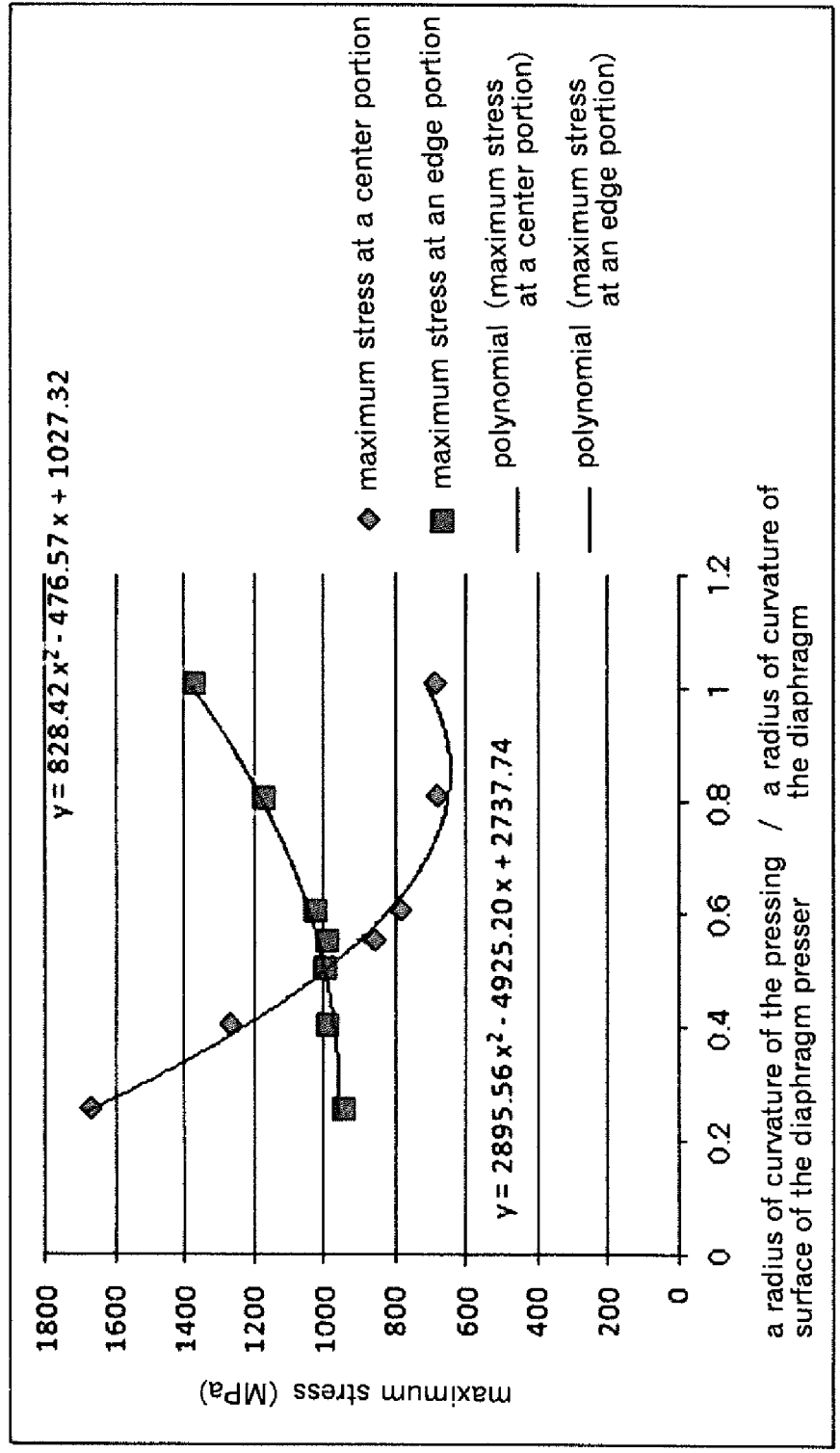
FIG. 8 is a graph showing how the maximum stress at the center portion and the maximum stress at the edge portion vary when SRb/SRa varies in the case where the diameter of the diaphragm is 26 mm.

FIG. 6 to FIG. 8 show how the maximum stress at the center portion of the diaphragm (5) and the maximum stress at the edge portion of the diaphragm (5) vary when SRb/SRa varies, on the basis of the results of computation of the stress applied on to the diaphragm (5) using the finite element method.

FIG. 6 shows the case where the diameter of the diaphragm (5) is 15 mm. FIG. 7 shows the case where the diameter of the diaphragm (5) is 20 mm. FIG. 8 shows the case where the diameter of the diaphragm (5) is 26 mm.

In all of FIG. 6 to FIG. 8, the maximum stress at the center portion has a tendency to decrease as SRb/SRa increases, and the maximum stress at the edge portion has a tendency to increase as SRb/SRa increases. Additionally, the maximum stress at the center portion exceeds 1000 MPa when SRb/SRa is less than 0.4, the maximum stress at the edge portion exceeds 1000 MPa when SRb/SRa is greater than 0.6, and the maximum stress at the edge portion and the maximum stress at the center portion are of the order, at most, of 1000 MPa when SRb/SRa=0.4 to 0.6.

According to actually conducted durability tests, when SRb/SRa is of the order of 0.7 to 1 (in the case of conventionally used diaphragm valves), breakage was caused around the edge portion of the diaphragm (5). In addition, in the case of the diaphragm valves in which SRb/SRa is of the order of 0.5, no breakage was caused through opening and closing operations over a million times, whereas breakage has been conventionally caused through opening and closing operations over several hundreds of thousands of times. Furthermore, when SRb/SRa is less than 0.4, a phenomenon occurs in which the diaphragm (5) breaks at the center portion at an early stage.

According to the above-described analytical results and durability test results, it is apparent that, regardless of the diameter of the diaphragm (5), when SRb/SRa=0.4 to 0.6 is satisfied, stress applied onto the diaphragm (5) is uniform, excessive stress onto the diaphragm (5) is alleviated, and durability of the diaphragm (5) is greatly improved.

In the above-described diaphragm valve, although the piston (11), the compression coil spring (biasing member) (12), the operational air introduction chamber (13), the operational air introduction channel (7a), and the like constitute the actuator (10) that vertically moves the stem (7) that vertically moves the diaphragm presser (6), the configuration of the actuator is not limited to that shown in FIG. 1.

The above-described technical idea that satisfying SRb/SRa=0.4 to 0.6 allows stress applied onto the diaphragm (5) to be uniform may be applicable to any diaphragm valve (1) regardless of the shape of each component of the diaphragm valve (1). In particular, applying the above-described technical idea to the direct touch type metal diaphragm valve contributes to improvement in reliability of a gas supply system of semiconductor manufacturing equipment, and the like.

INDUSTRIAL APPLICABILITY

The present invention is suitable for a direct touch type metal diaphragm valve, which is used, for example, in a gas supply system of semiconductor manufacturing equipment. Because the durability of the diaphragm is improved, the present invention contributes to improvement in performance of the semiconductor manufacturing equipment, and the like.

The invention claimed is:

1. A diaphragm valve comprising:
   a valve body provided with a fluid channel;
   a valve seat provided on a peripheral edge of the fluid channel;
   a diaphragm having a spherical surface and configured to be pressed against or separated from the valve seat to close or open the fluid channel;
   a diaphragm presser having a lower end that has a spherical surface and serves as a pressing surface and configured to press the diaphragm; and
   an actuator configured to move the diaphragm vertically;
   wherein SRb/SRa =0.4 to 0.6 is satisfied, where SRa represents a radius of curvature of the diaphragm and SRb represents a radius of curvature of the pressing surface of the diaphragm presser.

2. The diaphragm valve according to claim 1, wherein the valve body has a depression with a bottom surface having: a circular flat portion, an annular depressed portion at the periphery of the circular flat portion and an outer periphery diaphragm support portion between the circular flat portion and the annular depressed portion.

3. The diaphragm valve according to claim 2, wherein a surface of an outer peripheral edge portion of the diaphragm contacts the diaphragm support portion.

4. The diaphragm valve according to claim 2, further comprising:
   a bonnet extending upwards and having a lower end portion that is screwed into an upper portion of the depression of the valve body; and
   a press adapter that is placed between a lower end surface of a bonnet and the bottom surface of the depression of the valve body and that holds an outer peripheral edge portion of the diaphragm between the press adapter and the bottom surface of the depression of the valve body, wherein an entire lower surface of the press adapter is tapered.

5. The diaphragm valve according to claim 1, wherein the diaphragm is made of a nickel alloy thin sheet, a stainless steel thin sheet, or a layered product formed of a stainless steel thin sheet and a nickel-cobalt alloy thin sheet.

* * * * *